Jan. 30, 1968  H. B. BROWN  3,365,735

THREAD TAPPER

Filed Sept. 10, 1965  2 Sheets-Sheet 1

INVENTOR
HARRY B. BROWN

BY  *James H. Littlepage*

ATTORNEY

Jan. 30, 1968   H. B. BROWN   3,365,735
THREAD TAPPER

Filed Sept. 10, 1965   2 Sheets-Sheet 2

INVENTOR
HARRY B. BROWN

BY *James H. Littlepage*

ATTORNEY

United States Patent Office 3,365,735
Patented Jan. 30, 1968

3,365,735
THREAD TAPPER
Harry B. Brown, Alexandria, Va., assignor to Applied Electro Mechanics, Inc., Alexandria, Va., a corporation of Virginia
Filed Sept. 10, 1965, Ser. No. 486,418
10 Claims. (Cl. 10—136)

ABSTRACT OF THE DISCLOSURE

A thread tapper tool consisting of a stand and an arm has a direct-current, vertical shaft, reversible electric motor on the arm. On the lower end of the motor shaft is coupled a spindle on which a hollow nut is rotatably mounted. The nut is constrained against rotation by an adjustable friction clutch anchored to the stand. Splined on the shaft is a sleeve which is supported by the stand so that it is free to move vertically on the splined spindle. An upward bias is applied to the sleeve. The upper end of the sleeve has external threads engageable in the nut, and on the lower end of the sleeve is a chuck for holding a tap. The sleeve has two ranges of movement axially of the spindle. In the first range of movement the threads on the sleeve and nut are engaged, providing fast forward or retractive drive of the spindle; and in the second range of movement the threads are disengaged, providing only rotational drive of the spindle, so that the sleeve is moved axially only by the reaction of the tool in the work. Upper and lower limit switches are provided for reversing the motor at the end of the desired downward limit of sleeve travel and for stopping the motor at the desired limit of its upward travel.

---

This invention relates to thread cutting apparatus and, more particularly, to a tapping machine.

The object of the invention is to provide a thread tapping machine wherein a tapping tool is rapidly advanced towards the work and forced slightly into a pre-drilled hole, and then rotated without forcible advance, the tapping tool then being free to screw itself into the work. Also in accordance with this invention it is intended that the tool, when it is to be backed out of the work, shall be reversely rotated without forced withdrawal up to the point at which the tap leaves the threads which it has cut and thereafter be rapidly retracted away from the work.

The apparatus of this invention is designed for use in connection with a control system as disclosed in the co-pending application entitled, Automatic Tapping Machine Control System, Ser. No. 486,419 filed concurrently herewith.

Figure 1:
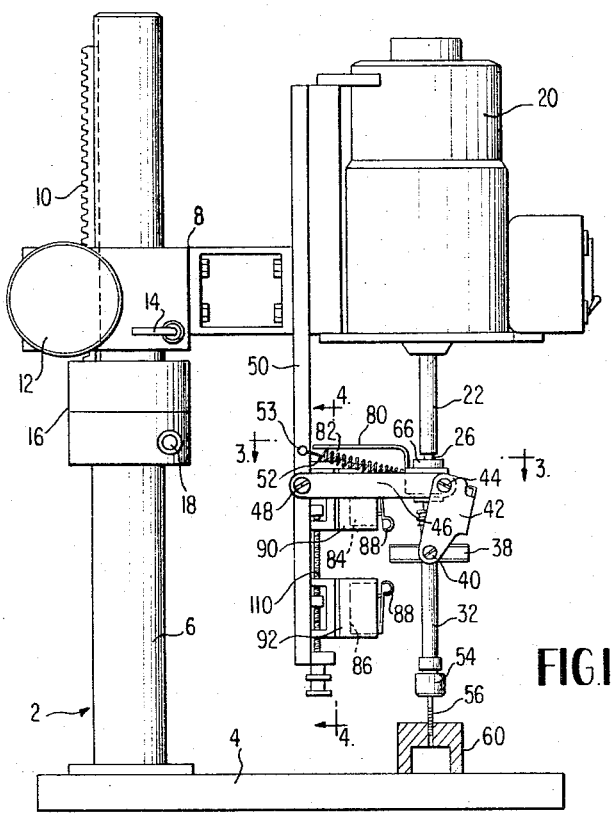
FIG. 1 is a side elevation showing the entire assembly.
Figure 2:
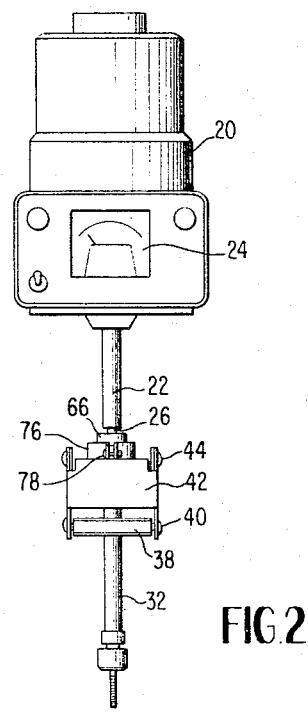
FIG. 2 is a front elevation of the drive elements removed from the stand.
Figure 3:
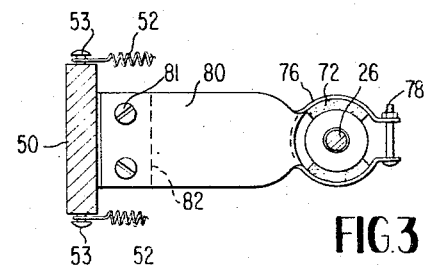
FIG. 3 is a fragmentary cross-section along the line 3—3 of FIG. 1.
Figure 4:
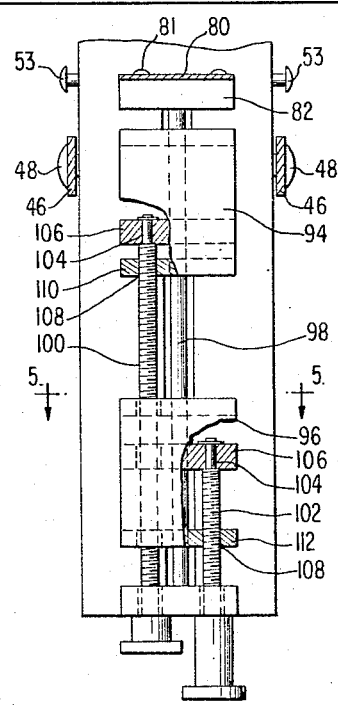
FIG. 4 is a fragmentary cross-section along the line 4—4 of FIG. 1.
Figure 5:
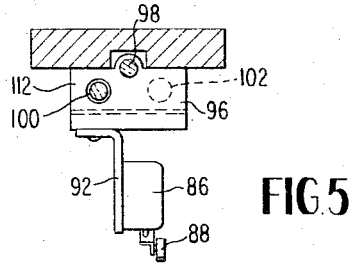
FIG. 5 is a fragmentary cross-section along the line 5—5 of FIG. 4.

Referring now to the drawings in which like reference numerals denote similar elements, the device which constitutes the invention is mounted on a stand 2 having a platform 4 and an upstanding post 6 from which projects an arm 8 which is adjustable by means of a rack 10 and a pinion, not shown, controlled by a knob 12. Arm 8 is held in adjusted position by a lock 14 and is limited in its downward movement by stop collars 16 clamped around post 6 by a clamp screw 18. The stand structure thus far described is conventional in drill presses.

The tool mechanism is driven by a direct current motor 20 which is controlled by a circuit which constitutes the subject matter of my co-pending application entitled Automatic Tapping Machine Control System, Ser. No. 486,419. Motor 20 has a downwardly projecting drive shaft 22 and on the front of the motor is mounted a meter 24 which indicates the torque loading of the motor. A spindle 26 is coupled as at 28 to the lower end of drive shaft 22 and from FIGS. 6–9 it will be apparent that the major part of the length of spindle 26 is supplied with splines 30 on which slides a sleeve 32 having internal splines 34 slidably engaging splines 30, the sleeve 32 rotating with spindle 26 at all times. Sleeve 32 is held in vertical disposition by means of a ball bearing 36 supported in a ring 38 connected by pivots 40 to the lower ends of links 42 which in turn are pivoted as at 44 to a free end of a lever 46 whose rear end is connected by pivots 48 to a vertical bar 50 affixed on and extending downwardly from arm 8. The free ends of lever 46 are counterbalanced upwardly by springs 52 anchored to studs 53 on bar 50 so that an upward bias is applied to sleeve 32. On the lower end of sleeve 32 is affixed a chuck 54 which, in typical operation of the mechanism, holds a tap 56 which cuts threads 57 in a pre-drilled bore 58 in the work 60.

Affixed on the upper end of sleeve 32 is a collar 62 having external threads 64, and rotatably mounted on spindle 26 at the upper end of splines 30 is a hollow nut 66 having internal threads 68 of pitch similar to and complementary with external threads 64 on collar 62. A clutch generally designated 70 consists of a sleeve 72 of friction material which frictionally engages around the cylindrical outer surface 74 of hollow nut 66 and a band 76 is seized around the friction material sleeve 72 by means of an adjustable clamp 78 so that the clutching engagement of sleeve 72 against the cylindrical nut surface 74 may be adjusted. Ordinarily, clutch 70 holds cylindrical nut surface 74 so that the latter does not rotate. Band 76 is affixed on the outer end of an arm 80 whose inner end is fastened by screws 81 to a block 82 rigidly affixed on vertical bar 50.

Upper and lower limit switches 84 and 86 are disposed so that the switch arms 88 are engagable by ring 38. Limit switches 84 and 86 are respectively supported by brackets 90 and 92 projecting outwardly from slides 94 and 96 which slide along a vertical post 98 extending downwardly from block 82 on vertical bar 50. Limit switches 84 and 86 are vertically adjustable by means of lead screws 100 and 102 whose upper ends are rotatively captive as indicated at 104 in horizontal plates 106 affixed on vertical bar 50, the lead screws being threadedly engaged as at 108 in flanges 110, 112 on slides 94 and 96.

Figures 6, 7, 8:
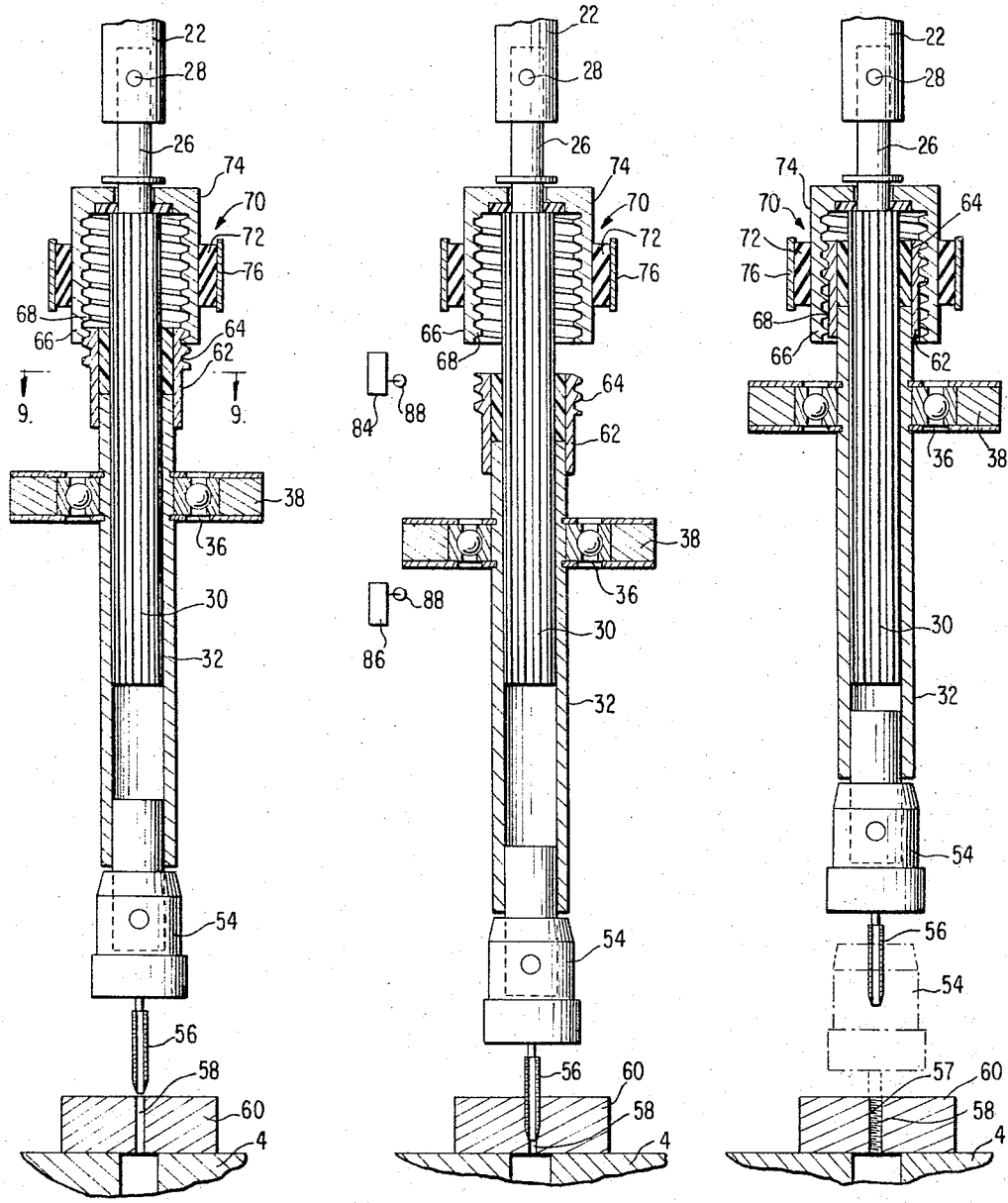
FIG. 6 is a partial cross section of the tool-driving element showing relative positions of the parts when the tap is about to enter the work.
FIG. 7 is a view similar to FIG. 6 but showing the relative position of the parts when the die has progressed nearly through the work.
FIG. 8 is a view similar to FIGS. 6 and 7 but showing the relative positions of the parts when the die has been completely withdrawn from the work; and, FIG. 9 is a cross-section along the line 9—9 of FIG. 6.
Figure 9:
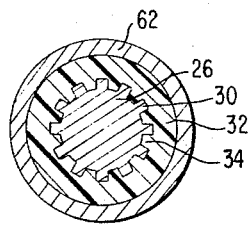

The mode of operation may be ascertained by comparing FIGS. 6, 7 and 8 with one another. At the start, the parts are in the relative positions shown in FIG. 8.

Upon clockwise rotation of spindle 26, externally threaded collar 64 rotates in internally threaded hollow nut 66, which at that time is frictionally held against rotation by clutch 70 so that sleeve 62 screws itself downwardly. FIG. 6 shows tap 56 in position where it is about to enter bore 58 in the work 60 and it will be observed that there is about a half of a turn left before the external threads 64 on collar 62 reach the lower end of internal threads 68 on hollow nut 66, this half turn of the threads being just enough to press the end of tap 56 into bore 58. Continued clockwise rotation of spindle 26 rotatably drives sleeve 32 and tap 56 so that the latter pulls itself downwardly through bore 58 until sleeve 38 engages arm 88 on lower limit switch 86, whereupon motor 20 is reversed and the counterclockwise rotation of tap 56 drives the latter upwardly so that the sleeve 32 slides upwardly along the splines 30 of spindle 26 until the upper end of the thread 64 on sleeve 62 threadedly engages the lower end of the threads 68 in hollow nut 66. At this point tap 56 leaves the work and continued clockwise rotation of spindle 26 causes sleeve 62 to screw itself back up into the hollow nut 66. It will be apparent that the vertical motion of sleeve 32 and the tap 56 which is held in the chuck 54 is raised during the time when sleeve 62 is threadedly engaged within hollow nut 66 so that the tap moves rapidly from a position in which it is spaced a substantial distance above the work at a point where the tap enters the work and, of course, the upward retraction of the tap 56 is very fast from the point at which it leaves the work to its upwardly retracted position (FIG. 8). Clutch 70 provides a safety feature in event upper limit switch 84 is adjusted upwardly so that motor 20 is not stopped when the parts reach their FIG. 8 position. When external threads 64 on sleeve 62 reach the top of internal threads 68 in hollow nut 66, sleeve 62 is blocked against further upward movement by the top of the hollow nut, and if the hollow nut were rigidly or completely non-rotatably supported, jamming or breakage would most likely occur. In this case, clutch 70 permits hollow nut 74 to rotate until the operator can either turn off motor 20 or reverse it so as to start the mechanism on a threading operation on a succeeding piece of work. In an actual embodiment constructed in accordance with this disclosure, motor 20 is controlled so as to operate in either a clockwise or counterclockwise rotation by means of a foot switch, not shown.

The invention is not limited to the details illustrated and described herein but is intended to cover all substitutions, modifications and equivalents within the scope of the following claims.

I claim:

1. A thread tapping machine, comprising
a support,
reversible drive means on said support,
a spindle drivingly coupled to said drive means,
a hollow sleeve splined on said spindle for rotation therewith,
a chuck on one end of said sleeve for holding a tap,
a hollow nut rotatably mounted on said spindle,
means normally restraining said hollow nut against rotation,
    said hollow nut having internal threads,
and external thread means on said sleeve threadedly engagable with the internal threads on the hollow nut,
said sleeve being axially slidable along said spindle throughout a first range of position in which the threads on said sleeve threadedly engage the threads in said nut so as to provide both rotational and fast forward and retractive drive of said sleeve by said spindle and said nut, and a second range of position wherein said threads are disengaged so as to provide rotational drive only of said sleeve by said spindle.

2. A thread tapping machine, comprising
a support,
reversible drive means on said support,
a spindle drivingly coupled to said drive means,
a hollow sleeve splined on said spindle for rotation therewith and axial sliding relative thereto,
a chuck on one end of said sleeve for holding a tap,
a hollow nut rotatably mounted on said spindle,
means normally restraining said hollow nut against rotation,
    said hollow nut having internal threads,
and external thread means on said sleeve threadedly engagable with the internal threads on the hollow nut, whereby to provide fast forward and retractive motion of a tap held by said chuck,
the means normally restraining said hollow nut against rotation comprising a friction clutch mounted on said support and frictionally engaging said hollow nut.

3. The combination claimed in claim 2,
and means for adjusting the frictional engagement of said friction clutch.

4. The combination claimed in claim 1,
and means on said support supporting said sleeve for movement relative to said support in the axial direction of said spindle.

5. A thread tapping machine, comprising
a support,
reversible drive means on said support,
a spindle drivingly coupled to said drive means,
a hollow sleeve splined on said spindle for rotation therewith and axial sliding relative thereto,
a chuck on one end of said sleeve for holding a tap,
a hollow nut rotatably mounted on said spindle,
means normally restraining said hollow nut against rotation,
    said hollow nut having internal threads,
and external thread means on said sleeve threadedly engageable with the internal threads on the hollow nut, whereby to provide fast forward and retractive motion of a tap held by said chuck,
and means biasing said sleeve for movement axially of said spindle in a direction to cause engagement of the external thread means with the internal threads in said hollow nut.

6. A thread tapping machine, comprising
a stand having an upright, reversible drive means on said upright,
a vertical spindle drivingly coupled to said reversible drive means,
a sleeve splined on said spindle for rotation therewith and vertical sliding thereon,
    said sleeve having upper and lower ends,
a chuck on the lower end of said sleeve,
external thread means on the upper end of said sleeve,
a hollow nut rotatably mounted on said spindle above said sleeve,
    said hollow nut having a downwardly open end and internal threads threadedly engagable with the external thread means on the upper end of said sleeve,
and friction clutch means on said stand for restraining rotation of said hollow nut.

7. The combination claimed in claim 6,
said friction clutch means comprising
    external cylindrical surface means on said hollow nut,
    a ring of friction material surrounding said external cylindrical surface means,
    a clamp for pressing said ring against said cylindrical surface means,
    and means mounting said clamp on said upright.

8. The combination claimed in claim 6,
a bearing member rotatably mounted around said sleeve for vertical movement therewith, and a tension spring connected between said bearing member and said upright for biasing said sleeve upwardly towards said hollow nut.

9. The combination claimed in claim 8, and at least one limit switch supported on said upright and having an arm in the path of said bearing member upon and engageable thereby upon telescoping movement of said sleeve relative to said spindle.

10. The combination claimed in claim 9, and means for adjusting said limit switch vertically relative to said upright.

References Cited

UNITED STATES PATENTS

| 610,455 | 9/1889 | McSweeny | 77—33.3 |
| 1,060,467 | 4/1913 | Leopold | 77—33.3 |
| 2,405,718 | 8/1946 | Schafer | 10—135 |

FRANCIS S. HUSAR, *Primary Examiner.*